US011165312B2

(12) United States Patent
Tokoi et al.

(10) Patent No.: US 11,165,312 B2
(45) Date of Patent: Nov. 2, 2021

(54) AXIAL-GAP DYNAMO-ELECTRIC MACHINE

(71) Applicant: Hitachi Industrial Equipment Systems Co., Ltd., Tokyo (JP)

(72) Inventors: Hirooki Tokoi, Tokyo (JP); Shuuichi Takahashi, Tokyo (JP); Yasuei Yoneoka, Tokyo (JP); Toshifumi Suzuki, Tokyo (JP); Toru Sakai, Tokyo (JP); Katsuyuki Yamazaki, Tokyo (JP); Norihisa Iwasaki, Tokyo (JP); Ryousou Masaki, Tokyo (JP); Yuji Enomoto, Tokyo (JP)

(73) Assignee: Hitachi Industrial Equipment Systems Co., Ltd., Tokyo (JP)

(*) Notice: Subject to any disclaimer, the term of this patent is extended or adjusted under 35 U.S.C. 154(b) by 782 days.

(21) Appl. No.: 15/303,984

(22) PCT Filed: Apr. 14, 2014

(86) PCT No.: PCT/JP2014/060567
§ 371 (c)(1),
(2) Date: Dec. 22, 2016

(87) PCT Pub. No.: WO2015/159332
PCT Pub. Date: Oct. 22, 2015

(65) Prior Publication Data
US 2017/0194823 A1  Jul. 6, 2017

(51) Int. Cl.
*H02K 11/01* (2016.01)
*H02K 3/52* (2006.01)
(Continued)

(52) U.S. Cl.
CPC .......... *H02K 11/0141* (2020.08); *H02K 1/20* (2013.01); *H02K 3/524* (2013.01); *H02K 9/08* (2013.01);
(Continued)

(58) Field of Classification Search
CPC .......... H02K 1/20; H02K 11/40; H02K 11/01; H02K 9/08; H02K 3/524; H02K 5/225; H02K 21/24
(Continued)

(56) References Cited

U.S. PATENT DOCUMENTS 5,440,185 A    8/1995  Allwine, Jr.
6,063,267 A *  5/2000  Crewson ................. C02F 1/487
                                                  204/554
(Continued)

FOREIGN PATENT DOCUMENTS

CN     202957727 U    5/2013
JP     61-240848 A   10/1986
(Continued)

OTHER PUBLICATIONS

Received STIC search report from EIC 2800 searcher Benjamin Martin on Nov. 2, 2018 for claims 1 and 16. (Year: 2018).*
(Continued)

*Primary Examiner* — Emily P Pham
*Assistant Examiner* — Htet Z Kyaw
(74) *Attorney, Agent, or Firm* — Crowell & Moring LLP

(57) ABSTRACT

This invention reduces the shaft voltage of an axial-air-gap dynamo-electric machine while ensuring high output and high efficiency. Said axial-air-gap dynamo-electric machine comprises the following: a stator comprising a plurality of stator cores, each of which comprises a core and a coil, arranged in a circle around a shaft; a housing, the inside surface of which faces the stator radially; and at least one
(Continued)

rotor, the surface of which faces the surface of the stator with a prescribed air gap interposed therebetween in the radial direction of the shaft. The rotor has, on the outside thereof, a conductive section comprising a conductive member. This axial-air-gap dynamo-electric machine has a first region where the inside surface of the housing faces the aforementioned conductive section radially and a second region, closer to the stator than the first region is, that extends to the coil side surfaces that face the rotor. The proportion of connecting wires in the second region is higher than in the first region.

21 Claims, 17 Drawing Sheets

(51) Int. Cl.
*H02K 11/40* (2016.01)
*H02K 1/20* (2006.01)
*H02K 9/08* (2006.01)
*H02K 21/24* (2006.01)
*H02K 5/22* (2006.01)

(52) U.S. Cl.
CPC ............ *H02K 11/40* (2016.01); *H02K 5/225* (2013.01); *H02K 21/24* (2013.01)

(58) Field of Classification Search
USPC .......................................................... 310/59
See application file for complete search history.

(56) References Cited

U.S. PATENT DOCUMENTS

| | | | | |
|---|---|---|---|---|
| 6,280,208 | B1 | 8/2001 | Masuda et al. | |
| 8,546,989 | B2 | 10/2013 | Watanabe et al. | |
| 8,816,542 | B2* | 8/2014 | Kim | H02K 5/225 |
| | | | | 310/43 |
| 9,391,499 | B2* | 7/2016 | Kim | H02K 1/14 |
| 9,780,616 | B2* | 10/2017 | Langford | H02K 1/146 |
| 10,263,487 | B2* | 4/2019 | Firat | H02K 3/521 |
| 2004/0164641 | A1* | 8/2004 | Yamada | H02K 1/148 |
| | | | | 310/216.105 |
| 2008/0106161 | A1 | 5/2008 | Matsuzaki et al. | |
| 2009/0001835 | A1 | 1/2009 | Kojima et al. | |
| 2010/0148611 | A1* | 6/2010 | Wang | H02K 1/14 |
| | | | | 310/156.37 |
| 2011/0221297 | A1* | 9/2011 | Langford | H02K 1/146 |
| | | | | 310/215 |
| 2012/0274157 | A1* | 11/2012 | Watanabe | H02K 11/40 |
| | | | | 310/43 |
| 2013/0221788 | A1* | 8/2013 | Yokota | H02K 21/04 |
| | | | | 310/156.49 |
| 2014/0009009 | A1 | 1/2014 | Deguchi et al. | |
| 2014/0009022 | A1* | 1/2014 | Kim | H02K 1/14 |
| | | | | 310/114 |
| 2018/0323679 | A1* | 11/2018 | Woolmer | H02K 7/108 |

FOREIGN PATENT DOCUMENTS

| | | | | |
|---|---|---|---|---|
| JP | H07274537 A | * | 10/1995 | ............. C02F 1/487 |
| JP | 2008-131683 A | | 6/2008 | |
| JP | 2012-5307 A | | 1/2012 | |
| JP | 2014-17915 A | | 1/2014 | |
| JP | 2017093034 A | * | 5/2017 | ............. H02K 5/10 |
| TW | M433019 U1 | | 7/2012 | |
| WO | WO 2012/012547 A1 | | 1/2012 | |
| WO | WO-2019065142 A1 | * | 4/2019 | ............. H02K 3/50 |

OTHER PUBLICATIONS

Received STIC search request from EIC 2800 searcher Salim Alam on Jun. 11, 2021. (Year: 2021).*
Extended European Search Report issued in counterpart European Application No. 14889587.3 dated Nov. 10, 2017 (10 pages).
Taiwanese-language Office Action issued in counterpart Taiwanese Application No. 104111993 dated Apr. 27, 2016 with English translation (Eight (8) pages).
International Search Report (PCT/ISA/210) issued in PCT Application No. PCT/JP2014/060567 dated Jul. 29, 2014 with English-language translation (two (2) pages).
Communication pursuant to Article 94(3) EPC issued in counterpart European Application No. 14889587.3 dated Feb. 20, 2019 (six (6) pages).

* cited by examiner

POSITION OF TERMINAL OF CONNECTING WIRE Z

ELECTROSTATIC CAPACITANCE BETWEEN CONNECTING WIRE AND ROTOR Cwr

AXIAL-GAP DYNAMO-ELECTRIC MACHINE

TECHNICAL FIELD

The present invention relates to an axial-gap dynamo-electric machine, and more particularly to an axial-air-gap dynamo-electric machine having a stator configured by a plurality of stator cores.

BACKGROUND ART

For energy conservation of electric apparatuses, and the like, the use of dynamo-electric machines, such as a variable speed machine and a permanent magnet synchronous machine, driven by an inverter, has been increased. These dynamo-electric machines have a problem that a common mode voltage generated by the inverter is electrostatically coupled between the coil and the rotor to generate a potential difference (hereinafter referred to as "shaft voltage") between the inner and outer rings of the bearing. This is because an excessive shaft voltage causes dielectric breakdown of the lubricating oil in the bearing, so that a current flows through the bearing to cause electrolytic corrosion of the bearing (see, for example, Patent Literature 1).

Patent Literature 1 discloses a technique for reducing the shaft voltage by shielding between the coil and the rotor. Specifically, Patent Literature 1 discloses an axial-gap dynamo-electric machine in which an insulating layer is provided on the entire stator surface of the stator core and the coil, which surface faces the rotor, and in which, on the stator surface, a conductive section and an insulation section are alternately formed in the direction perpendicular to the flow of the magnetic flux of the stator core. That is, the conductive is electrically connected to the core which is at ground potential. Thereby, a large eddy current does not occur in the conductive section, as a result of which it is possible to shield between the coil and the rotor and to significantly reduce the electrostatic capacitance.

Further, Patent Literature 2 discloses a technique in which the shaft voltage of an axial-air-gap dynamo-electric machine is reduced by focusing on the structures, such as the grounding structure of a plurality of cores, and the shielding structure between the coil, the rotator, and the shaft, which structures are specific to the axial-air-gap dynamo-electric machine. Specifically, in Patent Literature 2, the end portion of the core is protruded from the bobbin on which the coil is wound, and the outside surface of the protruded core and the inside surface of the housing are made electrically conductive to each other by a conductive member, so that the core is grounded. Further, Patent Literature 2 discloses a configuration in which a tubular conductive member is arranged between the rotating shaft side central portion of the ring shaped stator and the shaft, and in which the tubular conductive member and the housing are made electrically conductive to each other to shield between the shaft and the coil.

CITATION LIST

PATENT LITERATURE 1: JP-A-2012-5307
PATENT LITERATURE 2: JP-A-2014-17915

SUMMARY OF INVENTION

Technical Problem

Here, in order to prevent the electrolytic corrosion of the bearing, it is also important to consider the relationship between the connecting wire section of the coil and the rotor. This is because there is a possibility that the electrostatic capacitance between the connecting wire section of the coil and the rotors is too large to be ignored. Usually, it is configured such that the connecting wire of the coil, which is led out from each of the stator cores, is arranged around the inner periphery of the housing section and is led out to the outside from a terminal box mouth, or the like. In the axial-air-gap dynamo-electric machine, the gap area which contributes to the torque output (the area of the opposing surface of the stator and the rotor) is approximately proportional to the square of the diameter of the gap. Therefore, the outer diameter of each of the stator core and the rotor tends to be designed to be large within a range of not interfering with the inner periphery of the housing. For this reason, the spatial allowance between the coil and the housings is reduced, so that the connecting wire is arranged to protrude correspondingly to the side of the rotor, to be close to the side surface of the rotor. When the number of the connecting wires and the conductor diameter of the connecting wire are large, the electrostatic capacitance between the connecting wires and the rotor becomes not negligible with respect to the electrostatic capacitance between the coil and the rotor.

In order to reduce the electrostatic capacitance between the connecting wires and the rotor, there are a method (1) of increase the distance between the connecting wires and the rotator, and a method (2) of reducing the facing area between the rotor and the connecting wire. However, in order to realize these methods, it is necessary that the outer diameter of the rotator is reduced to secure the distance or that the outer diameter of the stator core is reduced to arrange the connecting wire between the coil and the housing. Each of these methods leads to the reduction of the gap area, as a result of which the characteristic of the motor is reduced, that is, the output and efficiency of the motor are reduced.

Therefore, it is desired that the axial-air-gap dynamo-electric machine can realize the reduction of the shaft voltage while securing high output and high efficient.

Solution to Problem

In order to solve the above-described problems, the invention described in the claims is applied. That is, the invention provides an axial-air-gap dynamo-electric machine including: a stator configured such that a plurality of stator cores, each having, at least, a core and a coil wound around the outer periphery of the core, are arranged in a circle around a shaft in the direction in which magnetic lines of force are parallel to the shaft; a housing having an inside surface facing the stators radially; and at least a rotor plane-facing the stator via a predetermined air gap in the shaft radial direction. The axial-air-gap dynamo-electric machine is characterized by including: a conductive portion made of a conductive member and provided on the outer peripheral side of the rotor; a first region formed by the inside surface of the housing and the conductive portion which radially face each other; and a second region formed on the stator side of the first region to extend to the coil side surface which faces the rotor, and is characterized in that the ratio of the connecting wires of the stator cores which wires are arranged in the second region is larger than the ratio of the connecting wires of the stator cores which wires are arranged in the first region.

Further, the invention provides an axial-air-gap dynamo-electric machine including: a stator configured such that a plurality of stator cores, each having, at least, a core and a coil wound around the outer periphery of the core, are arranged in a circle around a shaft in the direction in which magnetic lines of force are parallel to the shaft; a housing having an inside surface facing the stators radially; and at least a rotor plane-facing the stator via a predetermined air gap expanding in the shaft radial direction. The axial-air-gap dynamo-electric machine is characterized by including an conductive portion made of a conductive member and provided on the outer peripheral side of the rotor, and is characterized in that the connecting wires of the stator cores are arranged in a region formed by the inside surface of the housing, the shaft direction end surface of the winding, and the conductive portion, and in that a conductive shielding member, electrically connected to the inside surface of the housing, is arranged between the connecting wires and the conductive portion.

Advantageous Effects of Invention

According to an aspect of the present invention, it is possible to obtain an effect that, in an axial-air-gap dynamo-electric machine, the shaft voltage is reduced while output and efficiency are secured. Further, it is possible to obtain an effect that the reliability against electric corrosion of the bearing is improved.

Other objects, structures, and advantages of the invention will become apparent from the following description.

DESCRIPTION OF EMBODIMENTS

First Embodiment

Figure 1A:
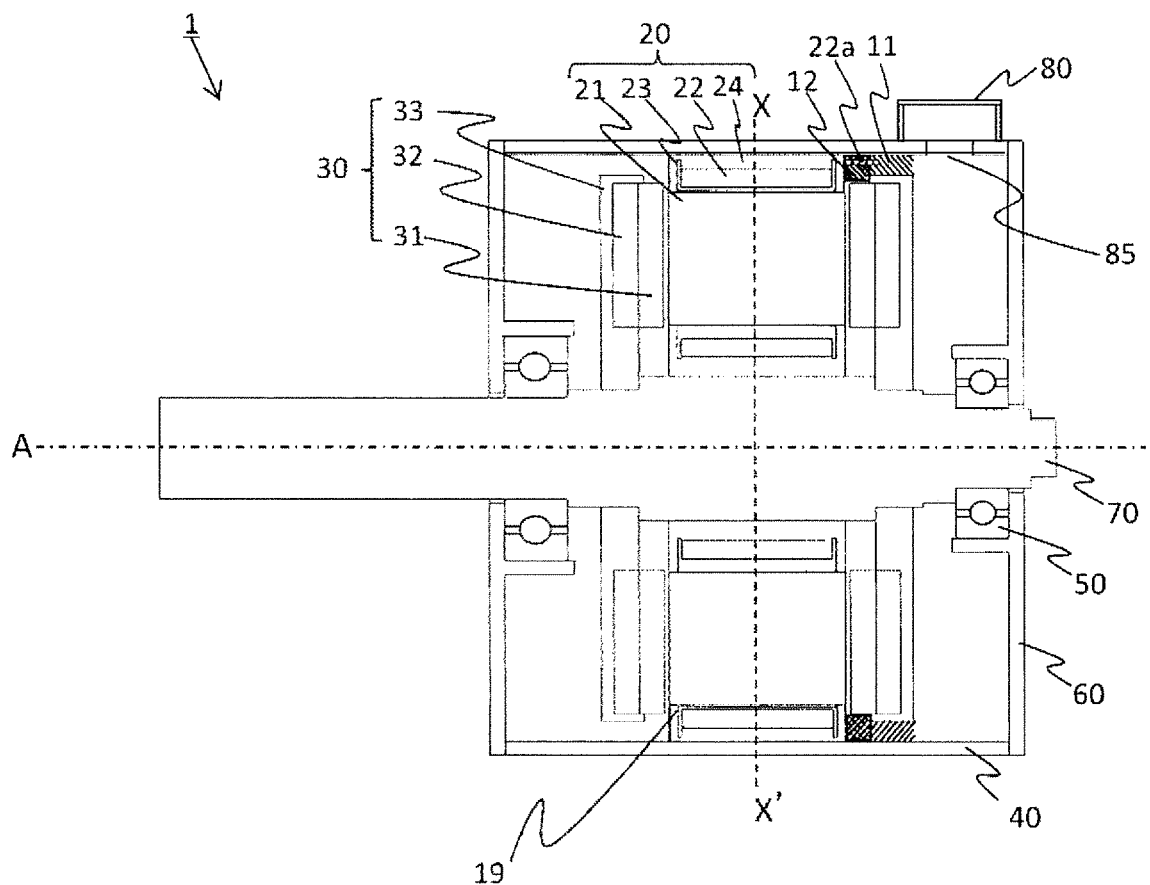
FIG. 1A is a cross-sectional side view showing a motor according to a first embodiment to which the present invention is applied.
Figure 1B:
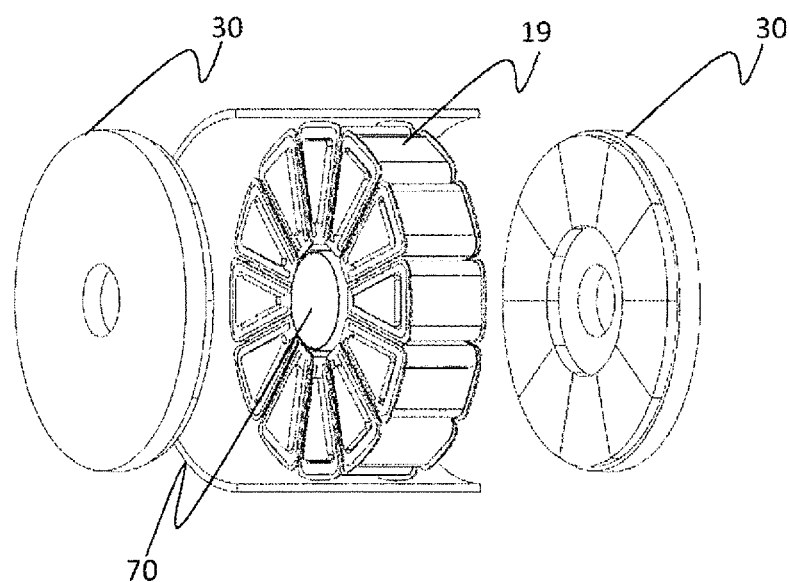
FIG. 1B is a perspective view showing an outline of a portion of the motor of the first embodiment.

In the following, embodiments of the present invention will be described with reference to the drawings. FIG. 1(a) is a rotating-shaft direction cross-sectional view showing a configuration of an axial-air-gap motor 1 (hereinafter abbreviated as "motor 1" in some cases) of a first embodiment as an example to which the present invention is applied. Further, FIG. 1(b) is an exploded perspective view showing an overview configuration of the armature of the motor 1.

The motor 1 is a so-called double-rotor type dynamo-electric machine in which a stator 19 having a schematically circular donut shape is arranged to plane-face two disk-shaped rotors 30 so as to be sandwiched between the two rotors 30 in the shaft direction.

The stator 19 has a configuration in which a plurality of stator cores 20 are arranged in a circle around a shaft 70 (in the present embodiment, the stator 19 has twelve stator cores 20). The stator core 20 is configured by: a prismatic body core 21 having a substantially trapezoidal shape or fan-shape at the side surface of each of both ends thereof; a bobbin 23 having a tubular section with the inner diameter substantially equal to the outer diameter of the core 21; and a coil 22 wound around the outer tubular section of the bobbin 23. The stator 19 is supported in such a manner that each of the stator cores 20 arranged in a circle and the inside surface of a housing 40 are integrally molded by resin 24.

The rotor 30 is configured by a permanent magnet 31 facing the end side surface of the core 21, a back yoke 32 arranged on the rear surface of the permanent magnet 31, and a yoke 33 supporting the permanent magnet 31 and the back yoke 32 and connected to the shaft 70 to be co-rotated with the shaft 70. The yoke 33 is made of a conductive member, such as metal. Although, in the present embodiment, the yoke 33 uses iron, but the yoke 33 is not limited to ion and may use aluminum or stainless steel (SUS, or the like).

The shaft 70 is rotatably coupled to an end bracket 60 via bearings 50. The end bracket 60 is fixed to the side surface of each of both ends of the housing 40.

A terminal box 80 is provided on the outside surface of the housing 40, and primary electric wires (not shown) are electrically connected to secondary electric wires (not shown) via terminal blocks. The connecting wire lied-out from the coil 22 is connected to the secondary electric wire.

The motor 1 configured in this way is operated as follows. The output lines of an inverter are connected to the primary electric wires of the terminal block, and AC currents are supplied to the coils 22. Thereby, a rotating magnetic field is formed in the stator 20, and thereby, a torque is generated by attraction and repulsion between the rotating magnetic field and a DC magnetic field formed in the rotor 30 by the permanent magnet 31. At this time, the common mode voltage of the inverter, which is generated in the coil 22, is electrostatically coupled with the side of the rotor 30 by the electrostatic capacitance between the coil 22 and the rotor 30. As a result, the rotor 30 has electric potential, and thereby, a voltage referred to as a shaft voltage is generated in the periphery portion around the bearing 50 provided between the rotor 30 and the housing 40 which is at ground potential.

Figure 2A:
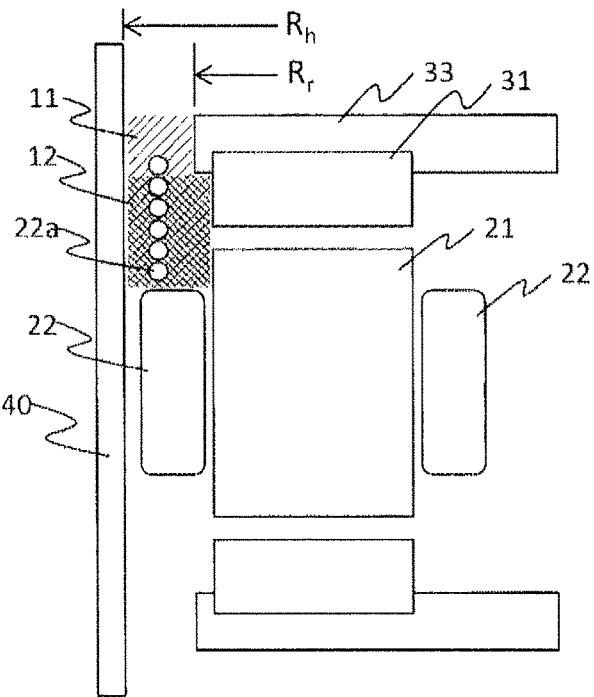
FIG. 2A is a partial cross-sectional enlarged view of the first embodiment.

FIG. 2(a) is a schematic enlarged cross-sectional view of the motor 1. In FIG. 2(a), illustration of some components, such as the back yoke 32, the resin 24, and the bobbin 23, is omitted. A part of or the whole of the connecting wires 22a are arranged in the region (space) located between the coil 22, the core 21, the rotor 30, and the housing 40 in the rotating shaft radial direction.

In the case where, in this space, a region, in which the end surface of the conductive member radially facing the housing 40 coincides with the outside surface of the rotor 30, is set as a first region 11, and where the region, in which the first region 11 is not included in this space, is set as a second region 12, the connecting wires 22a are arranged such that the ratio in which the connecting wires 22a are arranged in the second region 12 is larger than the ratio in which the connecting wires 22a in the first region 11. It should be noted that the yoke 33 is formed of iron, and the outer diameter of the yoke 33 is larger than the outer diameter of the permanent magnet 31. For this reason, the region, which is formed by the outside surface of the permanent magnet 31, the housing 40 and the coil 22, is set as the second region 12.

The shaft voltage Vb due to the common mode voltage Vcom is expressed by following expression 1.

[MATH. 1]

$$V_b = V_{com} \frac{C_{wr}}{C_{wr} + C_{rf} + C_b}$$ [MATH. 1]

Here, Cwr represents the electrostatic capacitance between the coil 22 and the rotor 30, and Crf represents the electrostatic capacitance between the coil 22 and the frame, that is, the housing 40 and the end bracket, and Cb represents the electrostatic capacitance between the inner ring and the outer ring of the bearing.

Figure 2B:
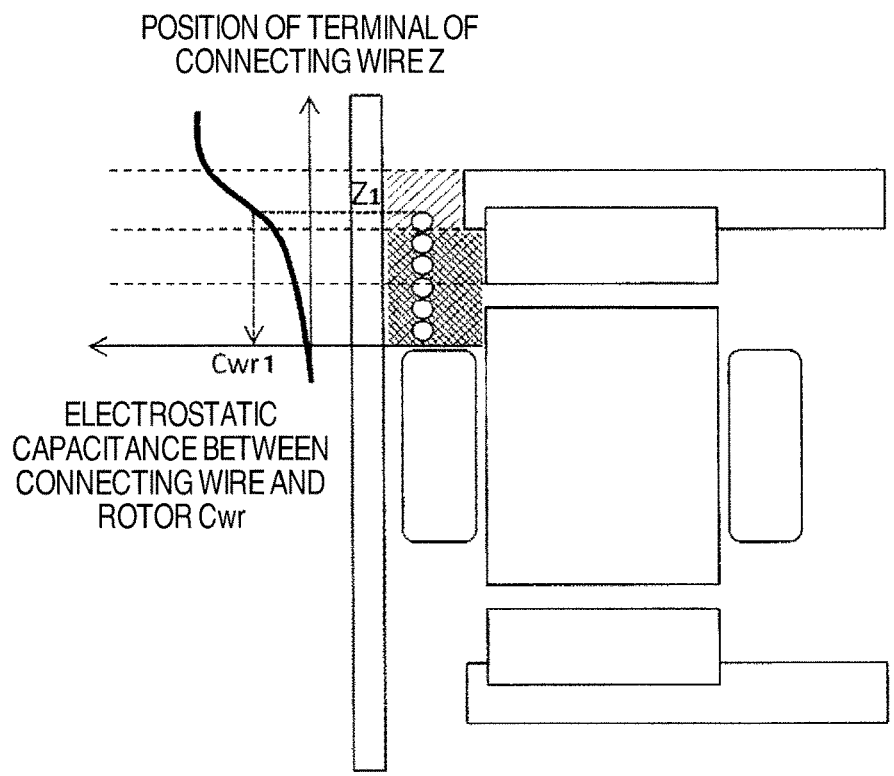
FIG. 2B is a schematic view showing the relationship of electrostatic capacitance between connecting wires and a rotor in the first embodiment.

FIG. 2(b) schematically shows the relationship between Cwr and the arrangement state of the connecting wires 22a. FIG. 2(b) shows the relationship between Cwr and the position of the end surface of the connecting wire, when the connecting wires 22a are stacked from the end surface of the coil 22 in the rotating shaft direction (here, defined as Z direction). Here, when the height of the connecting wires is less than the coil 22, the distance between the connecting wires 22a and the conductive member of the rotor 30 becomes large, Cwr is sufficiently small. Similarly, in the region in which the height of the connecting wires is lower than the position of the yoke 33, the increasing gradient of Cwr is small. On the other hand, when the height of the connecting wires is higher than the yoke 33, the connecting wires 22a closely faces the yoke 33, and thereby, Cwr increases rapidly.

As shown in FIG. 2(a), in the first embodiment, most of the connecting wires are arranged in the second region 12, and hence, it is possible to suppress that the shaft voltage is increased by the connecting wires 22a. Thereby, the electric discharge in the lubricating oil of the bearing 50 is suppressed, and also, electric corrosion of the bearing is suppressed.

Further, since a part of the connecting wires 22a are arranged on the side of the rotor 30 from the coil 22, the outer diameter of the core 21, and the winding width of the coil 22 in the rotating shaft direction, or the outer diameter of the coil 22 can be correspondingly maximized. Thereby, it is possible to suppress the shaft voltage without reducing the output and efficiency of the motor.

Further, in the case where a non-conductive ferrite magnet, or the like, is used as the permanent magnet 31, when the outer diameter of the permanent magnet 31 coincides with the outer diameter of the yoke 33, or when the permanent magnet 31 protrudes into the outer diameter side of the yoke 33, the second region 12 is formed on the outside surface of the permanent magnet 31.

Figure 3:
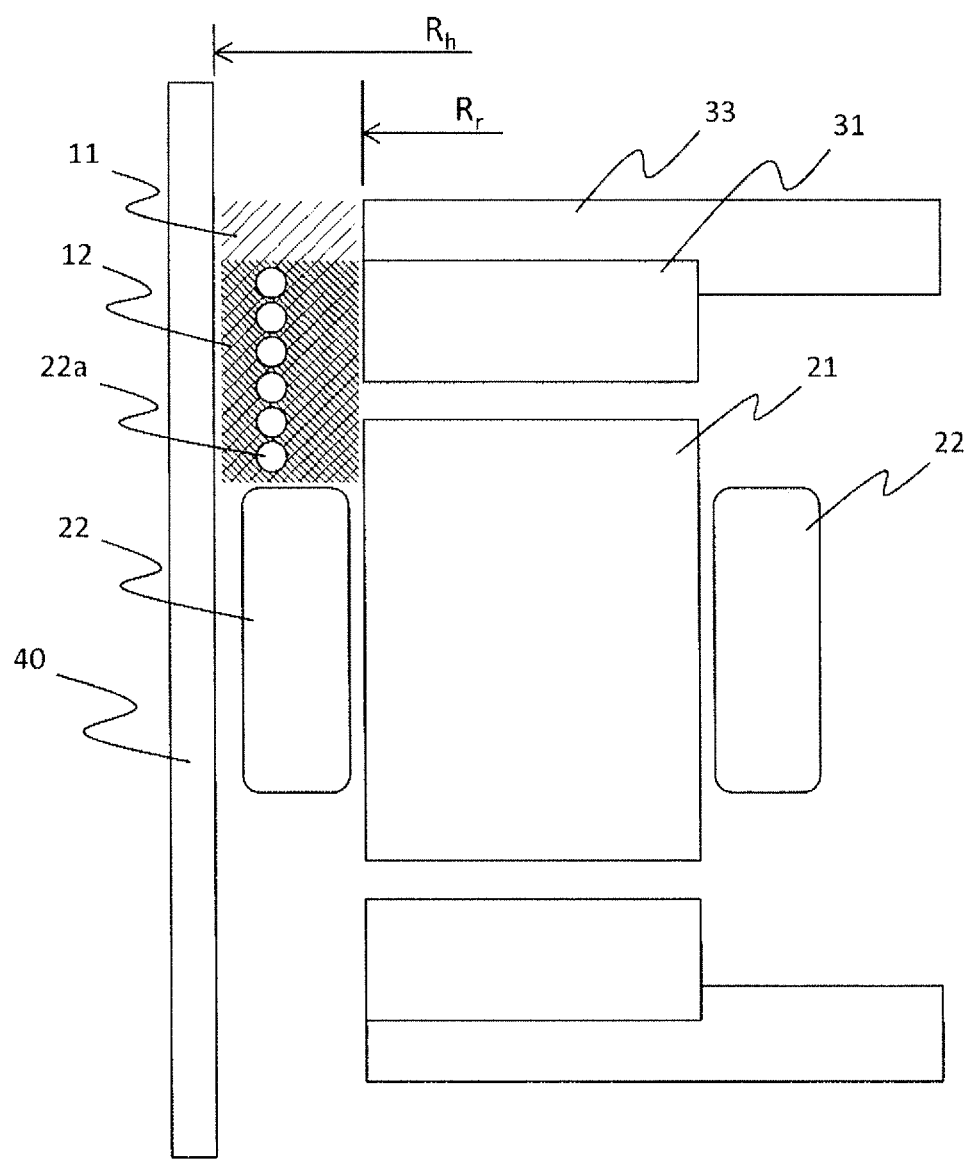
FIG. 3 is a partially enlarged view showing another example of the first embodiment.

FIG. 3 shows an example of this case. According to this structure, it is possible to increase the magnet diameter and also to reduce the electrostatic capacitance between the rotor 30 and the connecting wires 22a, as a result of which it is possible at the same time to increase the output and efficiency of the motor and to reduce the shaft voltage.

It should be noted that the present embodiment is described by taking the double-rotor type motor 1 as an example, but the present embodiment may also be applied to an axial-air-gap dynamo-electric machine having a single rotor structure in which one rotor 30 faces one stator 90. Further, the present embodiment may be applied to a synchronous reluctance motor, a switched reluctance motor, or an induction motor, each of which does not have the permanent magnet 31. Further, the present embodiment may be applied to a generator other than the motor.

Second Embodiment

One of the characteristics of the motor 1 of the second embodiment, to which the present invention is applied, is that the motor 1 is provided with two layers of the connecting wires 22a.

Figure 4A:
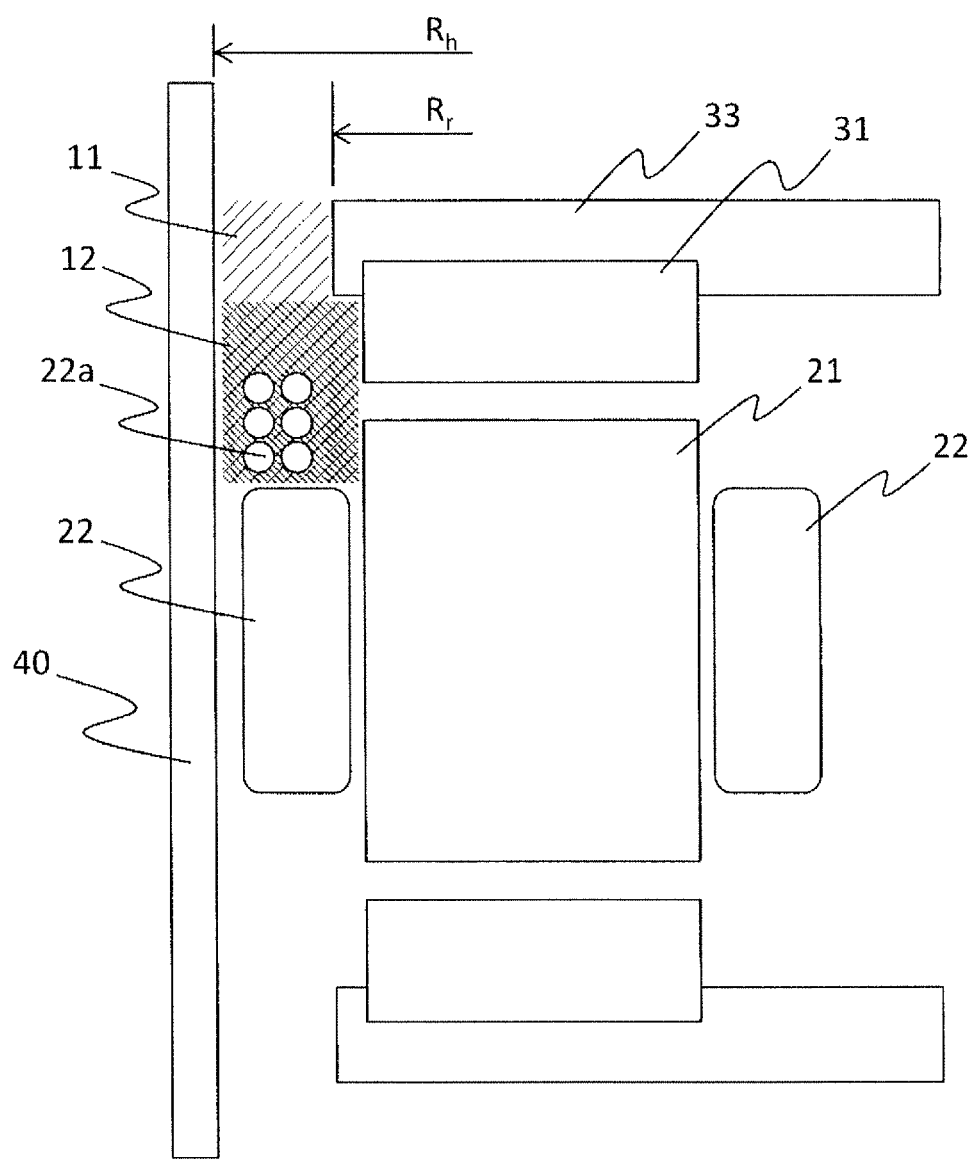
FIG. 4A is a partial cross-sectional enlarged view of a motor of a second embodiment.

FIG. 4(a) is a partial cross-sectional enlarged view of the motor 1 of the second embodiment. It should be noted that the same portions as those in the first embodiment are denoted by the same reference numerals and characters and the explanation thereof is omitted.

Two layers of the connecting wires 22a are arranged close to the coil 22 in the second region 12 so that the two layers are arranged in the rotating shaft center direction. The distance between the connecting wires 22a and the first region 11 is further increased. Further, in the present embodiment, two layers of the connecting wires 22a are provided, and hence, a holding member for stabilizing the connecting wires 22a is provided.

Figure 4B:
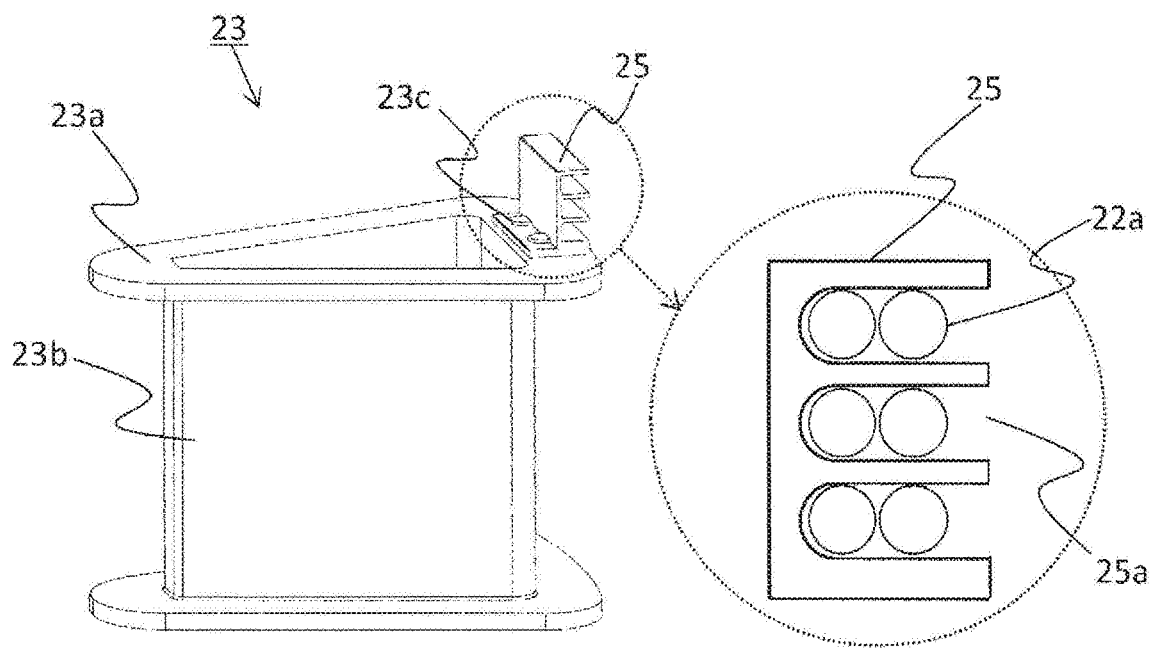
FIG. 4B is a perspective view showing an example of a holding member of the second embodiment.
Figure 4C:
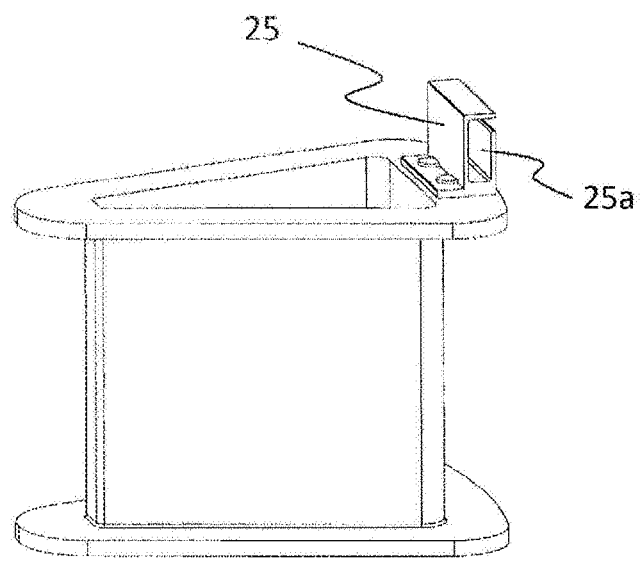
FIG. 4C is a perspective view showing another example of the holding member of the second embodiment.

FIG. 4(b) shows a holding member 25 which can be used for positioning the connecting wires. The holding member 25 is molded by resin, or the like, and is arranged on a flange 23a formed in the bobbin 23 and on the side of the housing. A protruding section 23c is provided on the arrangement surface of the bobbin 23 to support the holding member 25. The holding member 25 has a connecting wire storage section 25a. The holding member 25 of FIG. 4(b) has a plurality of the connecting wire storage sections 25a, and hence, the connecting wires can be easily positioned. It is preferred that the holding member 25 is provided on each of the bobbins, but a certain effect can be obtained even when the holding member 25 is provided on every other, every third, or the like, bobbin. The storage density of the connecting wires can be increased, and hence, even when the second region is narrow, a large number of the connecting wires 22a can be arranged. FIG. 4(c) shows the holding member 25 provided with one connecting wire storage section 25a.

The connecting wires are arranged in two layers, and hence, it is possible to reduce the projection area of the connecting wires 22a, which is seen from the rotor 30. Further, the height of the group of the connecting wires 22a is reduced, and hence, it is possible to increase the distance between the connecting wires 22a and the conductive member of the rotor 30. With these, the electrostatic capacitance between the connecting wires 22a and the rotor 30 can be reduced. Further, since the holding member 25 is used, the workability of the wiring work is improves, and also the stability of the connecting wires is increases.

It should be noted that, in the present embodiment, an example, in which the connecting wires 22a are arranged in two layers, is shown, but the connecting wires 22a may be arranged in more layers. Further, the holding member 25 may not be retained on the bobbin 23. Further, the holding member 25 may have a shape in which the holding member 25 is continuously formed along the entire circumference around which the connecting wires 22a are arranged. The connecting wire storage section 25a may also have a shape in which a plurality of the connecting wires 22a are collectively arranged.

Third Embodiment

One of the characteristics of the motor 1 of a third embodiment, to which the present invention is applied, is that the connecting wires 22a are arranged symmetrically on the inside surface side of the housing 40.

Figure 5A:
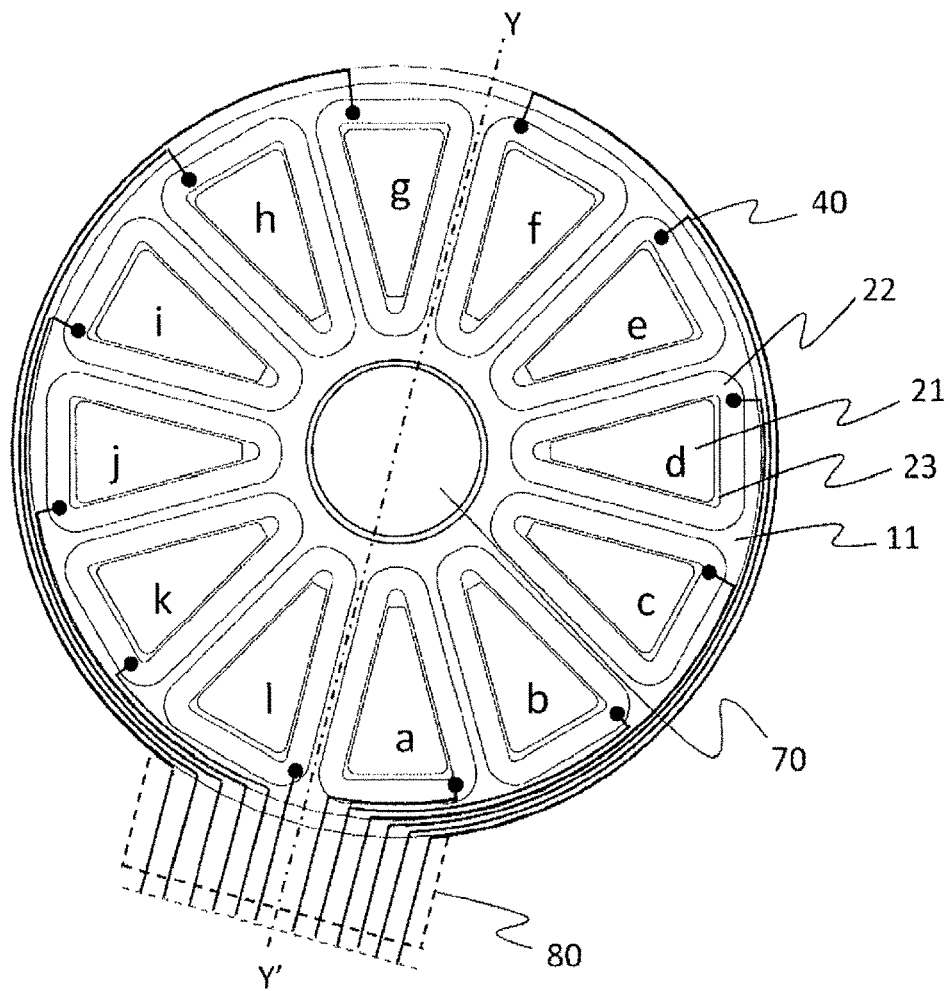
FIG. 5A is a cross-sectional view along line Y-Y' of a motor of a third embodiment.
Figure 5B:
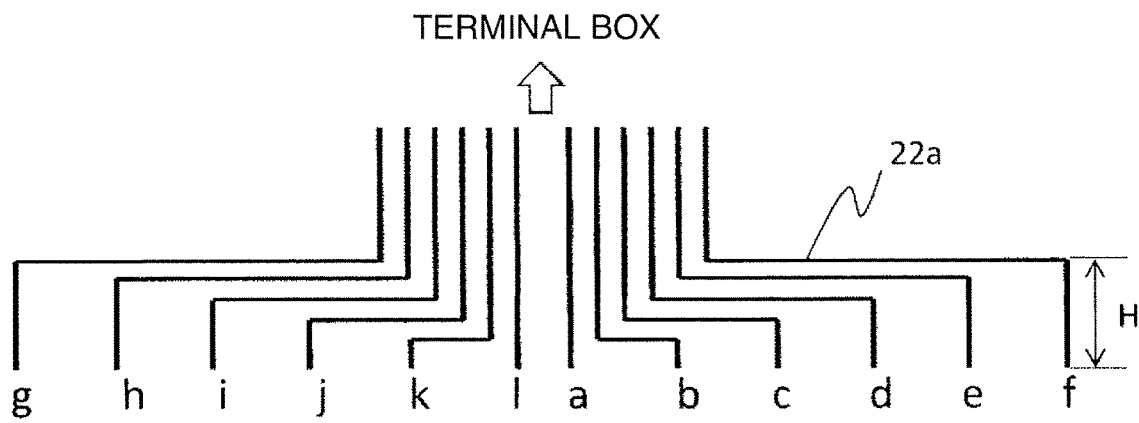
FIG. 5B is a circumferential-direction developed view of the connecting wires shown in FIG. 5A.

FIG. 5(a) is a cross-sectional view along the line X-X' in FIG. 1. Further, FIG. 5(b) schematically shows a development view of the connecting wires 22a which are arranged centering on the line Y-Y' in FIG. 5(a). It should be noted that the same portions as those in the first embodiment are denoted by the same reference numerals and characters and the explanation thereof is omitted.

As shown in FIG. 5(a), the connecting wires 22a led out respectively from the stator cores 20a to 20l are arranged symmetrically with respect to the line Y-Y' obtained by connecting the terminal box 80 (hole) and the shaft of the rotor 30. As shown in FIG. 5(b), the circumferential wire portions of the connecting wires of the stator cores 20c more away from the terminal box 80 are arranged at the position closer to the first region 11 as compared with the connecting wires of the stator core 20b closer to the terminal box 80. That is, the average of the heights H of the connecting wires 22a arranged in the circumferential direction, which heights are measured respectively from the end surfaces of the stator cores 20, is reduced, and thereby, the distance between the connecting wires 22a and (the conductive part/the first region 11 of) the rotor 30 can be increased to reduce the electrostatic capacitance therebetween.

Figure 6A:
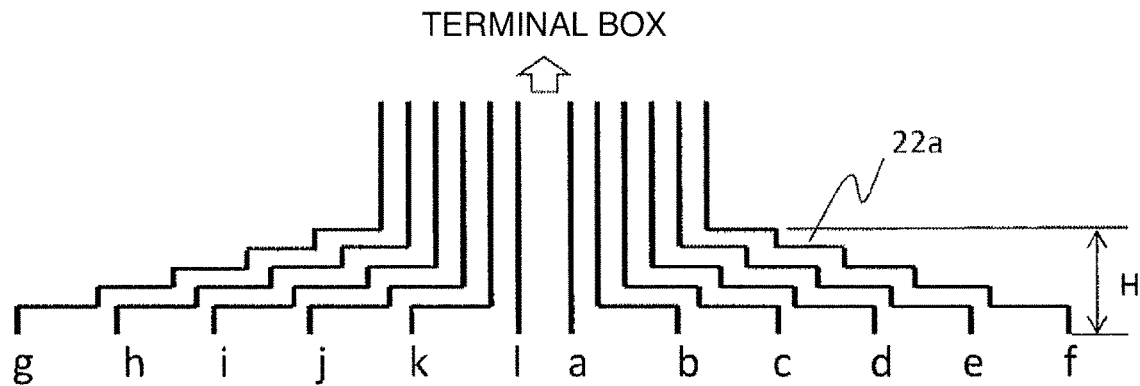
FIG. 6A is a circumferential-direction developed view showing another arrangement example of the connecting wires of the third embodiment.
Figure 6B:
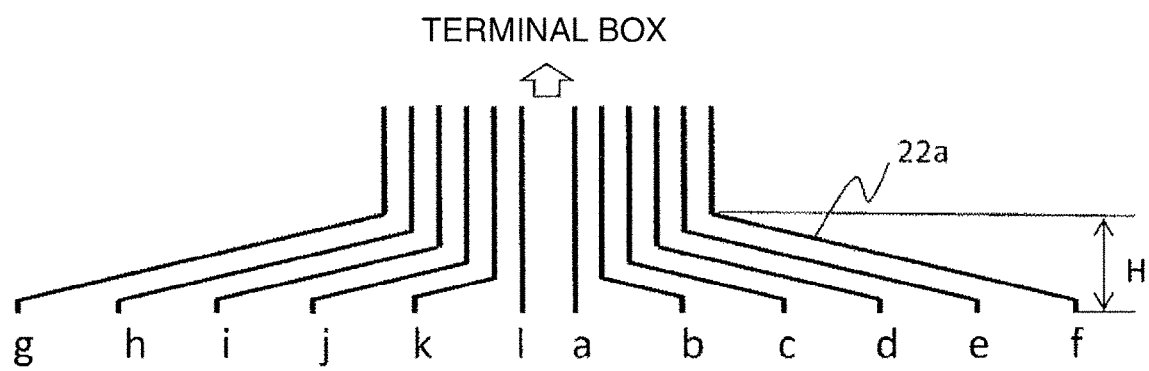
FIG. 6B is a circumferential-direction developed view showing another arrangement example of the connecting wires of the third embodiment.

Further, FIG. 6(a) and FIG. 6(b) show another arrangement examples in which the connecting wires 22a are symmetrically arranged (each is a development view). In FIG. 6(a), each of the connecting wires 22a is arranged stepwise. In FIG. 6(b), each of the connecting wires 22a is arranged to be tapered. With each of the arrangements, the distance between the connecting wire 22a and the first region 11 can be sufficiently secured, and thereby, the electrostatic capacitance therebetween can be reduced.

Figure 6C:
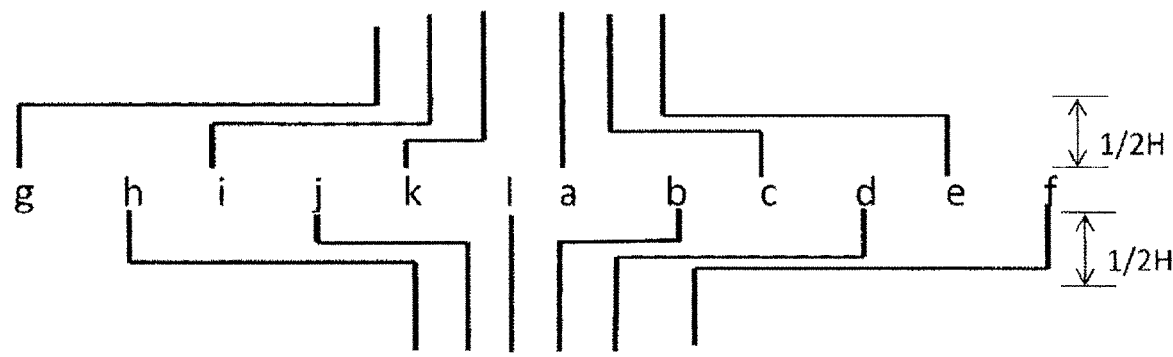
FIG. 6C is a circumferential-direction developed view showing another arrangement example of the connecting wires of the third embodiment.

Further, FIG. 6(c) shows another arrangement example (development view) in which the connecting wires 22a are symmetrically arranged. In FIG. 6(c), the connecting wires 22a of the stator cores 20 are arranged such that the connecting wire 22a arranged on one output side and the connecting wire 22a arranged on the output side opposite to the on one output side are alternately arranged in a symmetric manner. The arrangement is realized in such a manner that a plurality of holes, through which the connecting wires 22a are led out to the terminal box 80, are provided, or that the connecting wires 22a on the one side are collected in the vicinity of the specific stator core 2 (for example, stator cores 20l) and then are aggregated with the group of the connecting wires on the other side. In the present embodiment, the distance between each of the connecting wires 22a and the first region 11 can be set to about ½H. It should be noted that, in place that every other connecting wire is arranged, every third, or the like, connecting wire may be arranged. Alternatively, the connecting wires 22a may also be arranged such that a half of the connecting wires subsequently arranged on the one side, and the other half of the continuous connecting wires arranged on the other side are opposite each other with respect to the shaft.

Fourth Embodiment

One of the characteristics of the motor 1 of a fourth embodiment, to which the present invention is applied, is that the connecting wires 22a are integrally molded with resin. Especially, the present embodiment shows an example of a process in which a plurality of the stator cores 20 arranged in a circle, and the connecting wires 22a are integrally resin-molded in the housing 40.

Figure 7A:
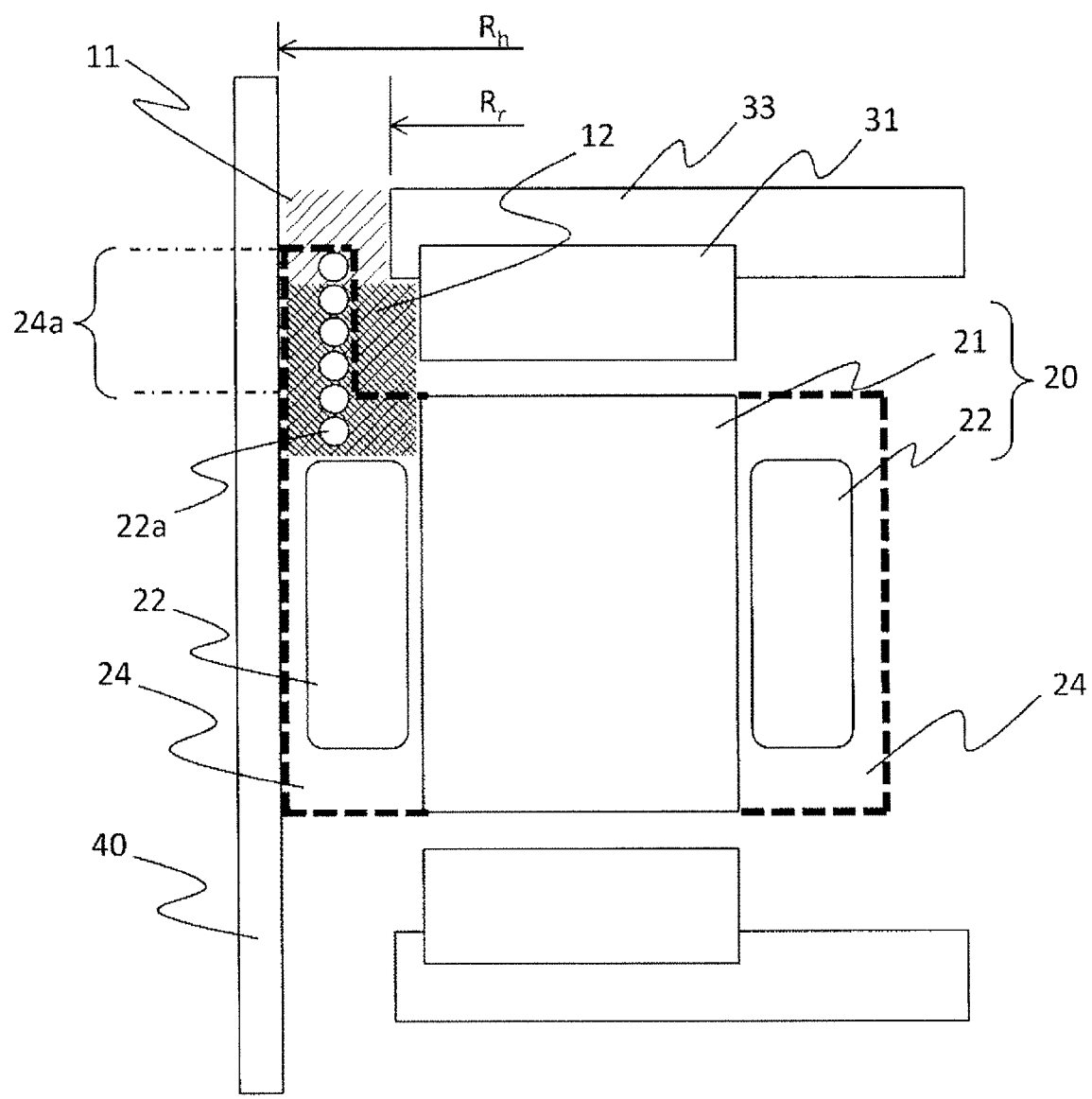
FIG. 7A is a partial cross-sectional enlarged view of a motor of a fourth embodiment.
Figure 7B:
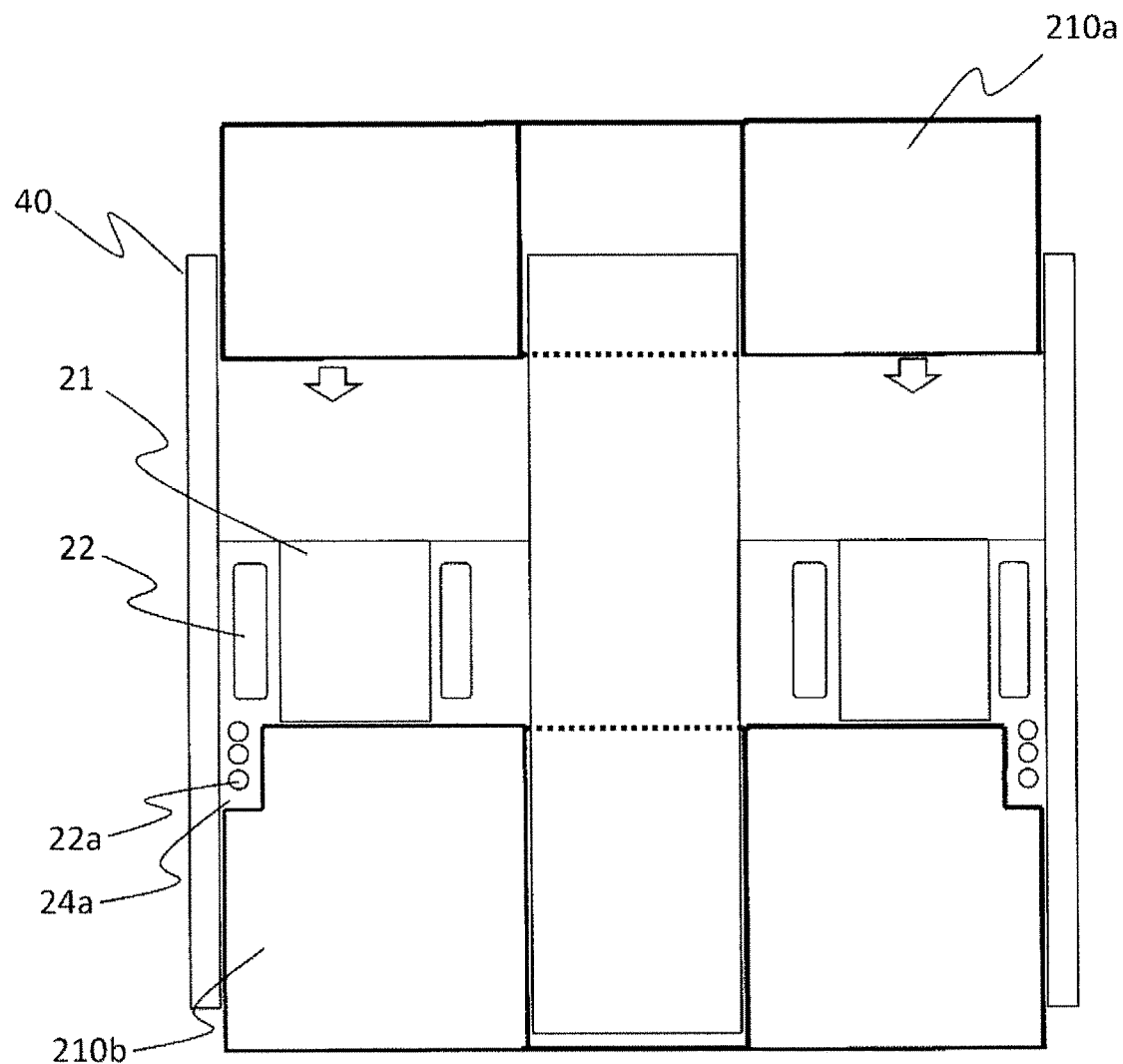
FIG. 7B is a schematic view showing a manufacturing process of a protruding section for resin-molding the connecting wires of the motor of the fourth embodiment.

FIG. 7(a) schematically shows a state in which the connecting wires 22a, the stator cores 20, and the housing 40 are molded by the mold resin 24. FIG. 7(b) schematically shows a molding process by a mold machine. It should be noted that the same portions as those in the first embodiment are denoted by the same reference numerals and characters and the explanation thereof is omitted.

As shown in FIG. 7(a), the motor 1 of the present embodiment is configured such that the core 21, the coil 22, and the bobbin 23 (not shown) are molded integrally with the housing 40 by the mold resin 24 (dotted line in FIG.

7(a)). At this time, together with these components, the connecting wires 22a are molded.

FIG. 7(b) specifically shows the process. From both opening of the housing 40, (upper and lower) metal molds 210 having the outer diameter approximately equal to the inner diameter of the housing 40 are inserted into the housing 40. The metal mold 210 has a prismatic body shape provided, at the center thereof, with a hole which allows the shaft 70, and the like, to pass therethrough. The outer diameter of the distal end portion of the lower metal mold 210b is set smaller than the outer diameter of the main body section of the lower metal mold 210b, to provide a space in which protruding sections 24a of connecting wires 22a are molded. The housing 40 is inserted into the lower metal mold 210b. A plurality of the stator cores 20 are arranged in a circle about the shaft. In this case, the connecting wires 22a are arranged in the space formed between the distal end portion of the lower metal mold 210b and the housing. Thereafter, the upper metal mold 210a is inserted into the housing 40 from the other side opening of the housing 40. Then, from emission ports provided at the distal end surfaces of the upper and lower metal molds, resin is emitted to the stator cores 20 sandwiched between the upper metal mold 210a and the lower metal mold 210b, and thereby, the connecting wires 22a are integrally molded.

Figure 7C:
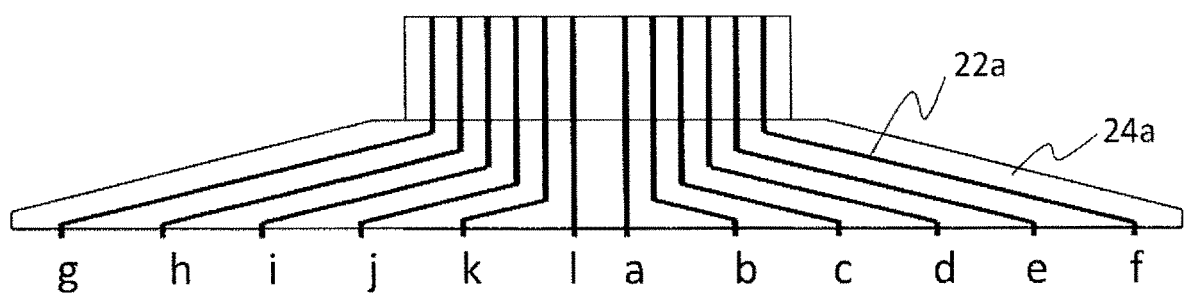
FIG. 7C is a circumferential-direction developed view after the resin-molding of the connecting wires of the fourth embodiment.

FIG. 7(c) is a development view of the connecting wire section with reference to line Y-Y'. In the present embodiment, the tapered connecting wires 22a are stacked as shown in FIG. 6(b), but each of the connecting wires is necessarily and sufficiently resin-molded. The outer peripheral step portions of the lower metal mold 210 may be processed to correspond to the arrangement, that is, the shape of the connecting wires, and then, the connecting wires may be arranged along the outer peripheral step portion.

With this structure, it is possible to improve the workability of lead-out work of the connecting wires. Further, it is possible to suppress that, at the time of molding, the connecting wires are deformed by receiving pressure from the resin 24, and thereby, the positional relationship between the connecting wires and the rotor 30 is changed.

It should be noted that it is preferred that, as in the embodiment 3 described above, when the connecting wires 22a are turned stepwise or in a tapered shape, the distal end outer periphery (small outer diameter portion) of the lower metal mold 210b is formed to prevent collapse of arrangement when the resin is emitted.

According to the structure of the present embodiment, the connecting wires are retained at desired positions, and hence, the positional relation between the rotor 30 and the connecting wires is not changed. The shaft voltage value is fixed, and thereby, the long-term reliability against the bearing electric corrosion can be improved.

Fifth Embodiment

One of the characteristics of the motor 1 of a fifth embodiment is that the connecting wires 22a are covered with an insulating material and that a thin plate member is provided on the shaft side of the connecting wires 22a.

Figure 8A:
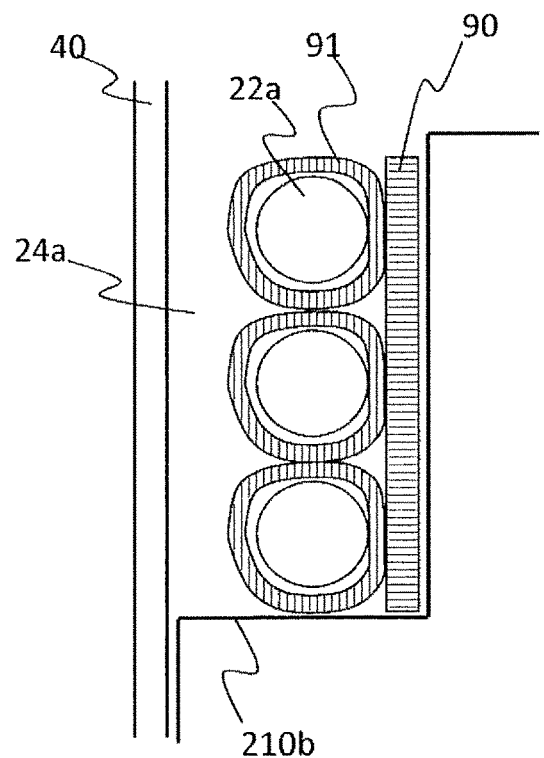
FIG. 8A is a partial cross-sectional view showing a state of connecting wires of a motor of a fifth embodiment.

FIG. 8(a) is an enlarged view of the protruding section 24a shown in the fourth embodiment (FIG. 7(b)). It should be noted that the same portions as those in the above-described embodiments are denoted by the same reference numerals and characters and the explanation thereof is omitted.

Each of the connecting wires 22a is covered by an insulating tube 91 made of a soft resin, rubber, or the like, each of which has insulating properties. Further, a thin plate member made of an insulator is provided in the protruding section 24a in the direction of the shaft 70 and is resin-molded. The thin plate member may have a ring shaped cylindrical structure having a low height.

Figure 8B:
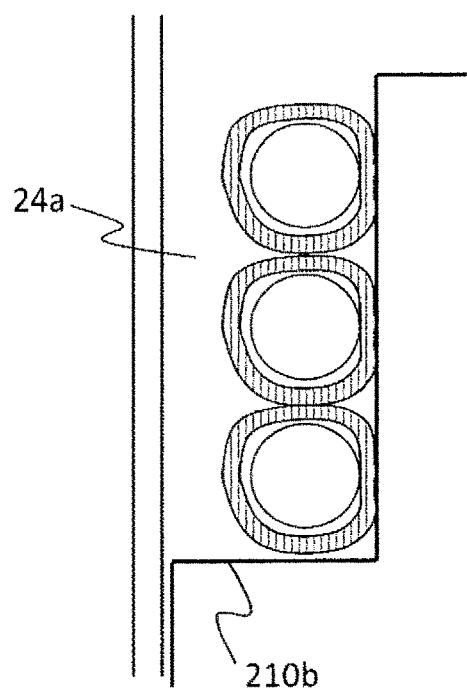
FIG. 8B is a schematic view showing a state after the molding of the connecting wires by a resin molding process as a comparison example.
Figure 8C:
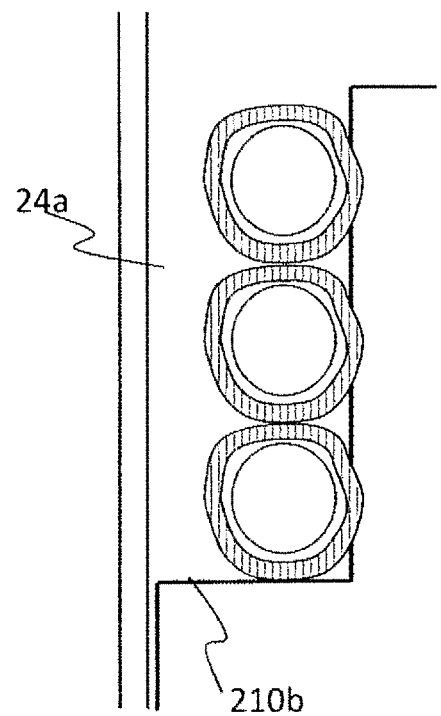
FIG. 8C is a schematic view showing a state after molding of connecting wires by a resin molding process as another comparison example.

The structure of the fifth embodiment prevents that, when the lower metal mold 210b is removed, the insulating tube 91 in contact with the lower metal mold 210b protrudes to the inner diameter side of the protruding section 24a as shown in FIG. 8(b) and FIG. 8(c). Thereby, the distance between the rotor 30 and the tube 91 can be securely managed, and hence, it is possible to suppress that the rotor 30 and the tube 91 are brought into contact with each other at the time when the motor is driven.

Further, the connecting wires 22a are arranged to be shifted in the outside radial direction by the distance corresponding to the thickness of the thin plate member 90 arranged on the inner radial direction, and hence, the distance with respect to the rotor 30 can be surely secured.

Further, although, when the lower metal mold 210b is removed, the connecting wires 22a may be pulled to the inner diameter side by adhesive force and tension between the metallic mold and the resin, the displacement of the connecting wires 22a due to the pulling force can be prevented by the thin plate member 90.

Sixth Embodiment

One of the characteristics of the motor 1 of a sixth embodiment, to which the present invention is applied, is that the connecting wires arranged in the first region and/or the second region are substantially completely shielded from Cwr.

Figure 9A:
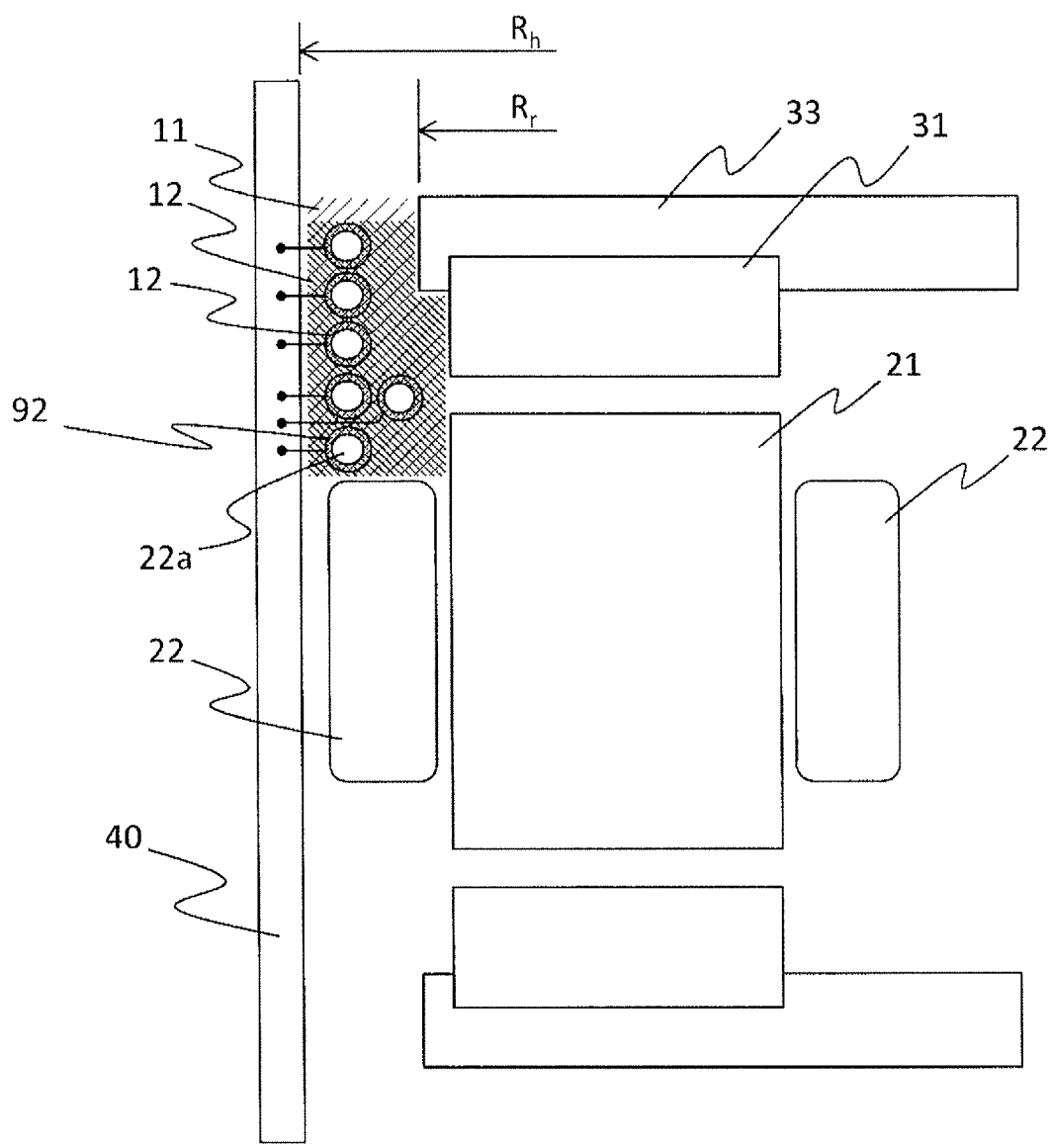
FIG. 9A is a partial cross-sectional enlarged view of a motor of a sixth embodiment.
Figure 9B:
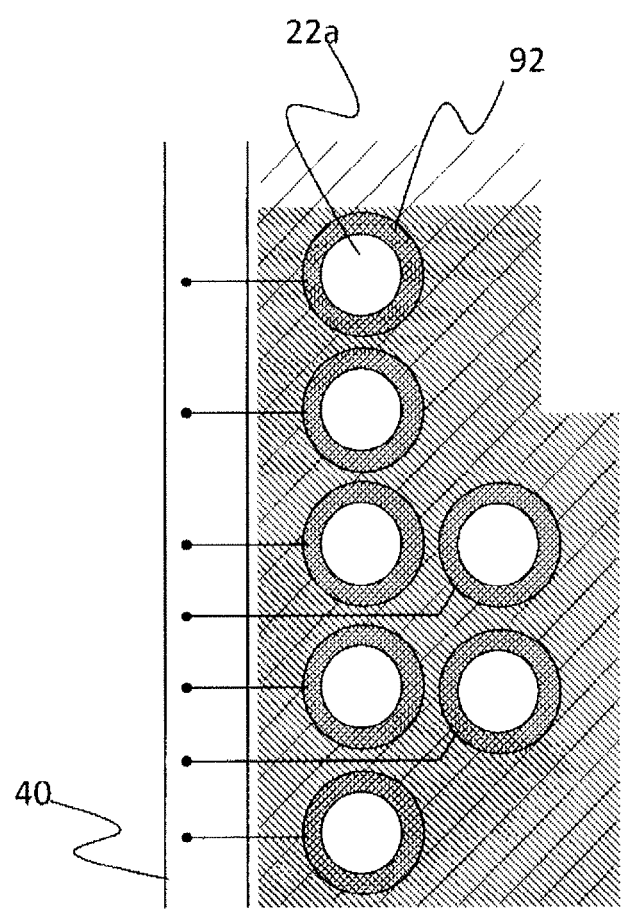
FIG. 9B is a further partial cross-sectional enlarged view of the motor of the sixth embodiment.
Figure 10A:
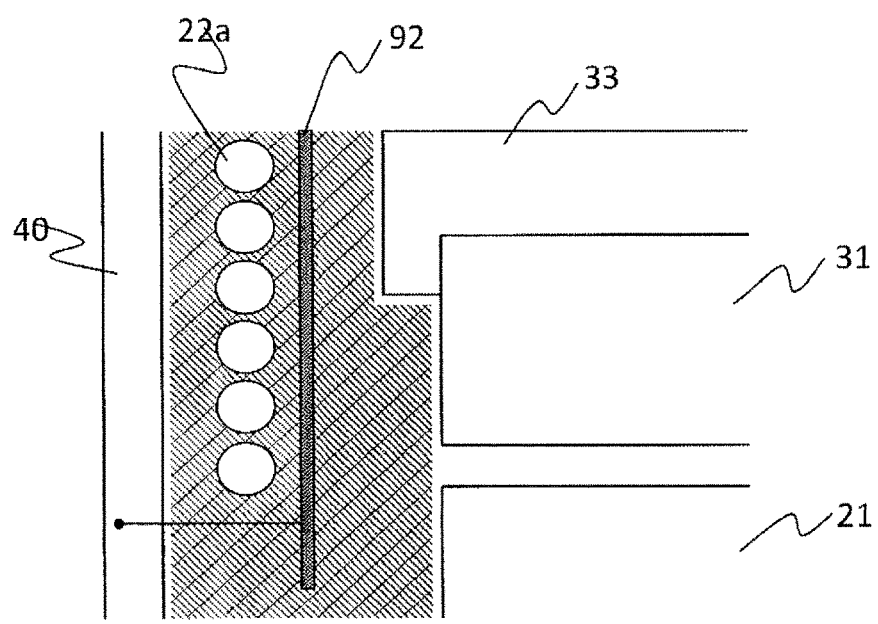
FIG. 10A is a partial cross-sectional enlarged view of a motor of a seventh embodiment.
Figure 10B:
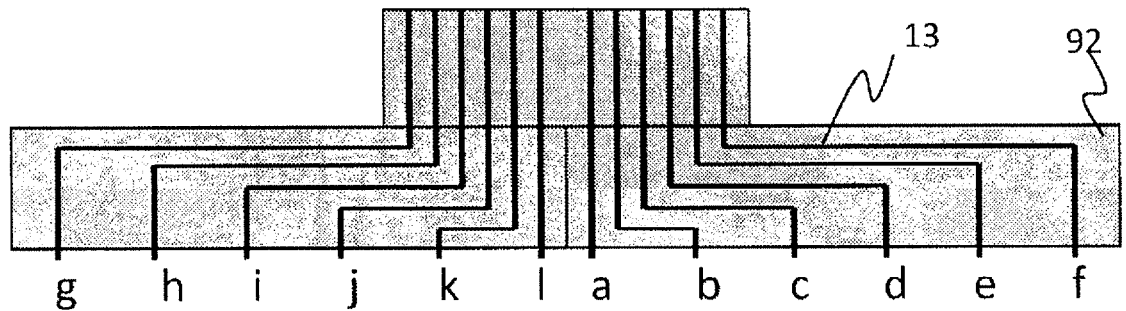
FIG. 10B is a development view showing an example of the conductive member shown in FIG. 10A.

FIG. 9(a) is a cross-sectional enlarged view of the motor 1. Further, each of FIG. 10(a) and FIG. 10(b) is a cross-sectional enlarged view of the connecting wire portion. It should be noted that the same portions as those in the above-described embodiments are denoted by the same reference numerals and characters and the explanation thereof is omitted.

Figure 9C:
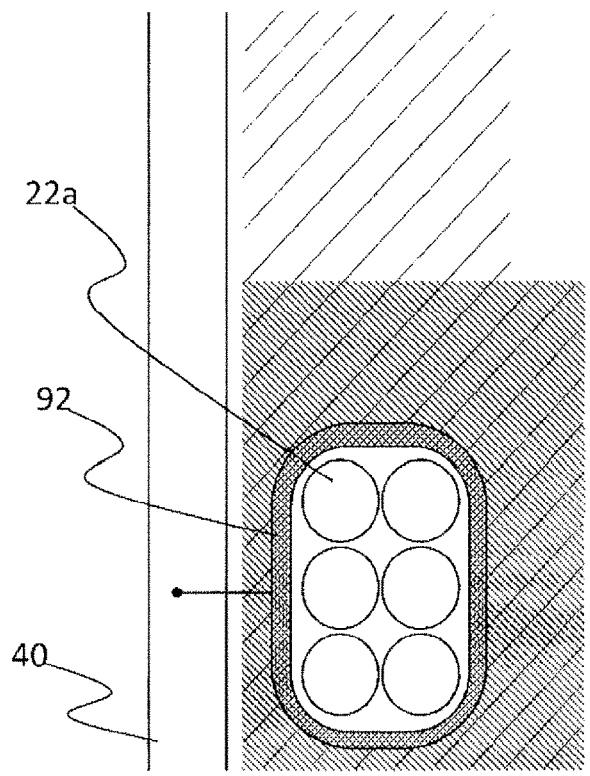
FIG. 9C is a partial cross-sectional enlarged view of another example of the motor of the sixth embodiment.

In the sixth embodiment, the connecting wires 22a are covered by a conductive member 92 respectively or in an aggregate form. Further, the sixth embodiment has a configuration in which the conductive member 92 is electrically connected to the housing 40. FIG. 9(a) shows an example in which each of the connecting wires is provided with the conductive member 92. Further, FIG. 9(c) shows an example in which a plurality of the connecting wires are stored in one conductive member 92.

In this structure, shielding is provided between the rotor 30 and the connecting wires, and hence, Cwr of the connecting wire section can be substantially reduced. Further, Crf is formed between the conductive member 92 and the rotors 30, and hence, this structure has an effect that the shaft voltage can be further reduced. As shown in FIG. 9(c), a plurality of the connecting wires are collectively stored in the conductive member 92, and thereby, the structure can be simplified.

A sealed tube, and the like, which is formed by affixing a conductive sheet to a shielded cable or a conductive foil to store a large number of cables, can be applied to the conductive member 92.

Seventh Embodiment

One of the characteristics of the motor 1 of a seventh embodiment, to which the present invention is applied, is that the connecting wires arranged in the first region and/or the second region are substantially completely shielded from Cwr.

FIG. 10(a) is a cross-sectional enlarged view of the connecting wire section of the motor 1. FIG. 10(b) is a development view of the connecting wires 22a along the line Y-Y' in FIG. 5(a). It should be noted that the same portions as those in the above-described embodiments are denoted by the same reference numerals and characters and the explanation thereof is omitted.

The motor 1 of the seventh embodiment is configured to include a continuous thin conductive member 92 formed between the rotors 30 and the connecting wires 22a along the inner periphery of the housing 40, and is further configured such that the thin conductive member 92 is electrically connected to the housing 40 by lead wires, or the like.

With this structure, it is possible to obtain the effect of reducing the shaft voltage similarly to the sixth embodiment. In the case of this structure, the rotor 30 and the conductive member 92 can be arranged to closely face each other, and hence, Crf can be increased to further reduce the shaft voltage. Further, the shape of the conductive member 92 can be simplified, and hence, the assembling efficiency can be improved. Similarly, the conductive member 92 and the housing 40 are electrically mutually connected at one place by the lead wire, or the like, and hence, the configuration can also be simplified.

Figure 10C:
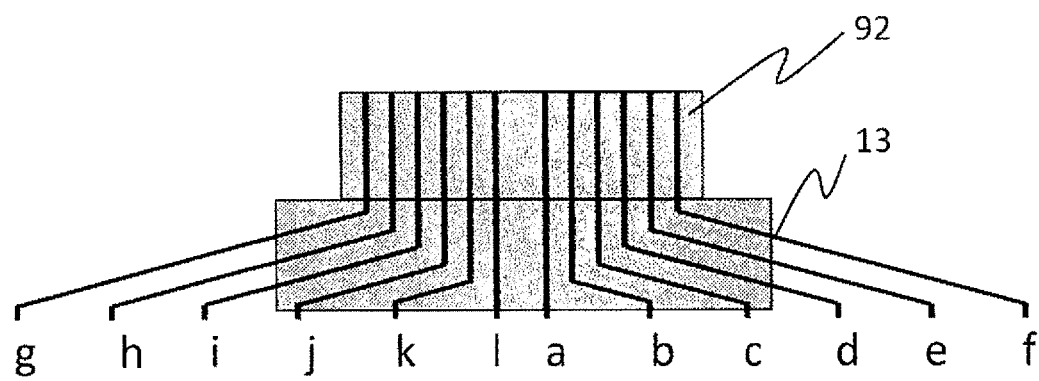
FIG. 10C is a circumferential-direction developed view showing another example of the conductive members shown in FIG. 10A.

FIG. 10(c) shows another example of the thin conductive member 92. The connecting wires 22a are arranged symmetrically with respect to the line Y-Y' connecting the terminal box 80 and the shaft 70, and the conductive members 92, formed symmetrically with respect to the line Y-Y', are arranged only in the vicinity of the terminal box 80.

With this structure, it is possible to efficiently shield between the rotor 30 and the connecting wires with a small amount of the conductive member 92. Further, the size of the member can be reduced, and the assembling efficiency can be improved.

Figure 10D:
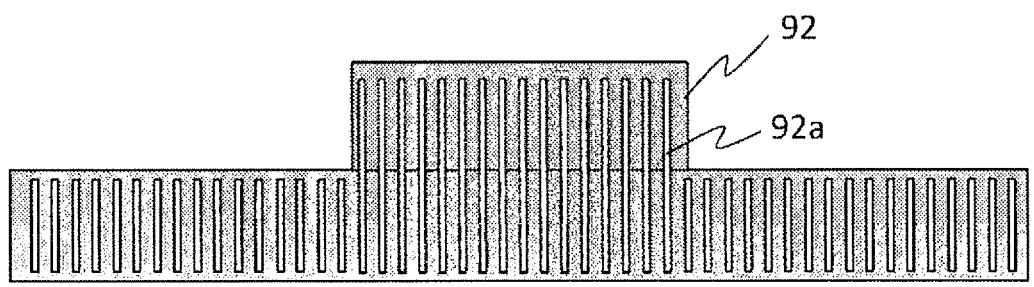
FIG. 10D is a circumferential-direction developed view showing another example of the conductive member shown in FIG. 10A.
Figure 10E:
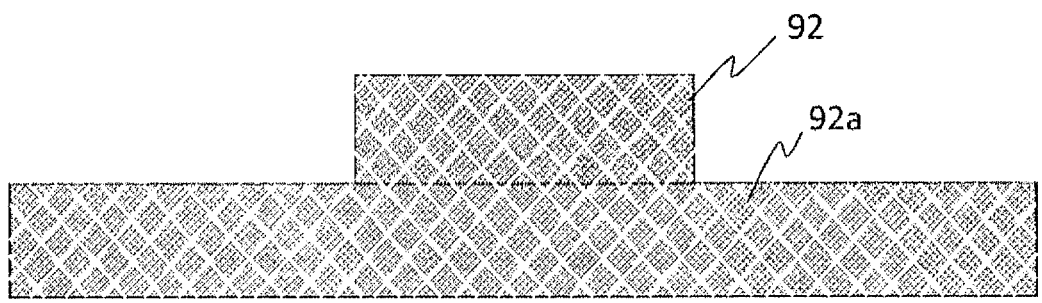
FIG. 10E is a circumferential-direction developed view showing another example of the conductive member shown in FIG. 10A.

Each of FIG. 10(d) and FIG. 10(e) is a circumferential-direction development view showing another example of the conductive member 92. Each of the conductive members 92 has a configuration in which the conductor portion and the insulation section 92a are repeatedly alternately arranged. In the example of FIG. 10(d), the insulation sections 92a are realized by providing slits. In FIG. 10(e), the insulation sections 92a are realized by a configuration in which conductive tape members, or the like, formed in a mesh shape, are affixed to an insulating plate member, and in which the meshes adjacent to each other are partially connected to each other.

With this structure, it is possible to suppress that eddy current flows into the conductive section by leakage flux to increase the loss. Therefore, it is possible to reduce the shaft voltage while maintaining high output and efficiency of the motor.

Eighth Embodiment

One of the characteristics of the motor 1 of an eighth embodiment, to which the present invention is applied, is that the connecting wires 22a are arranged in the region extending to the housing side outer periphery of the core 21, and shields the connecting wires 22a by the conductive member 92 on the side of the rotor 30.

Figure 11:
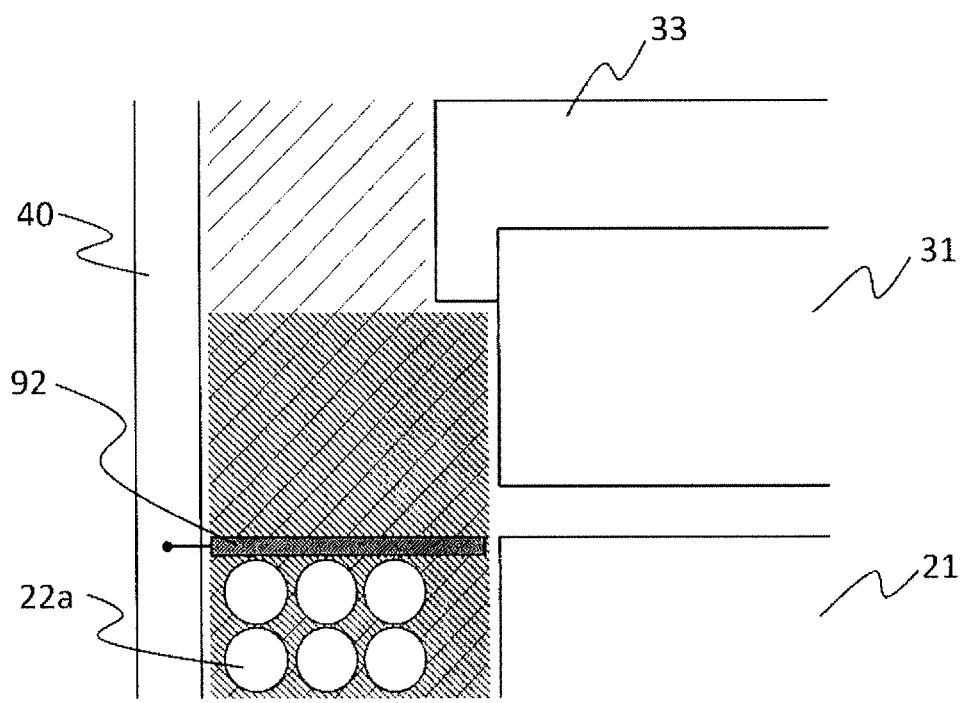
FIG. 11 is a partial cross-sectional enlarged view of a motor of an eighth embodiment.

FIG. 11 is a cross-sectional enlarged view of the periphery of the connecting wires of the motor 1. The present embodiment has a configuration in which the core 21 protrudes from the coil 22 in the shaft direction. Further, the conductive member 92 is arranged at the upper portion of the coil 22 horizontally with respect to the shaft direction end surface of the core 21. A part of or all of the connecting wires 22a are arranged in the region formed between the conductive member 92 and the end surface of the coil 22. The conductive member 92 is electrically connected to the housing 40.

FIG. 11 is a circumferential-direction development view of the conductive member 92. Each of the conductive members 92 is configured such that the conductor portion and the insulation section 92a are repeatedly alternately arranged.

With this structure, it is possible to suppress that eddy current flows into the conductive members 92 by leakage flux to increase the loss. Therefore, it is possible to reduce the shaft voltage while maintaining high output and efficiency of the motor.

With this structure, it is possible to shield between the rotor 30 and the connecting wires, and hence, it is possible to significantly reduce Cwr of the connecting wire section. Further, Crf is formed between the conductive member 92 and the rotor 30, and hence, it is possible to obtain the effect that the shaft voltage is further reduced. The connecting wires 22a arranged on the radial direction side of the rotor 30 can be reduced, and hence, the output and efficiency of the motor can be improved by increasing the diameter of the rotor 30.

Ninth Embodiment

One of the characteristics of the motor 1 of a ninth embodiment, to which the present embodiments is applied, is that, in the motor 1 having the open slot type stator 19, the shielding is arranged between the shaft and the shaft direction coil end surface facing the rotor 30.

Figure 12A:
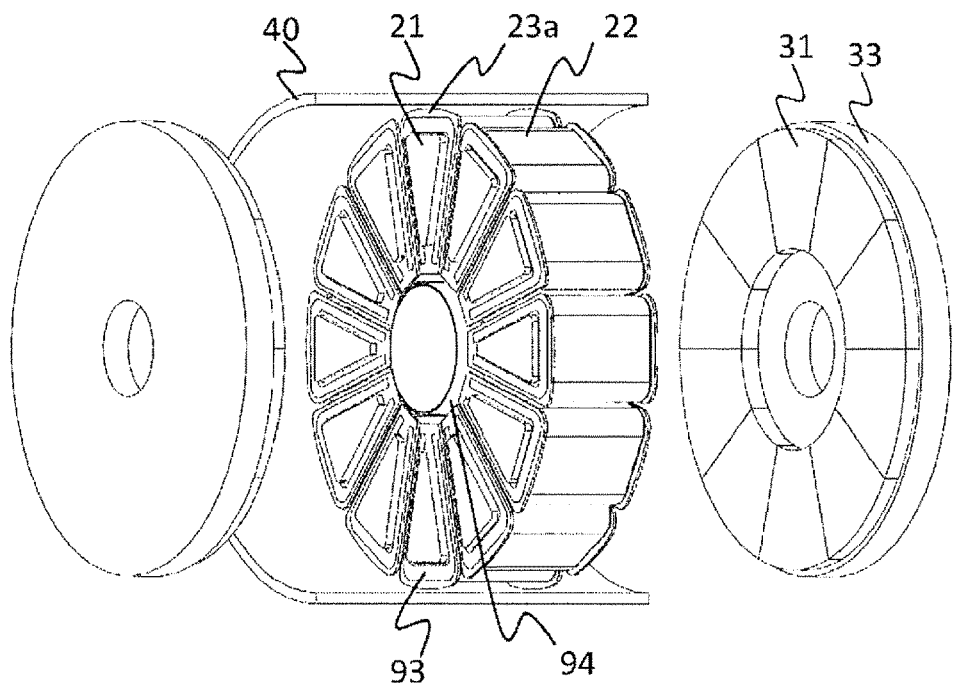
FIG. 12A is a perspective view showing a main part configuration of a motor by a ninth embodiment.

FIG. 12(a) is a perspective view showing an outline of the armature portion of the motor 1. The motor 1 is provided with an open slot core 21 always having a substantially trapezoidal cross-section. The core 21 is insulated from the coil 22 by the bobbin 23. The flange 23a of the bobbin 23 is arranged on the end surface of the coil 22. Over the entire periphery of the flange 23a on the side of the rotor 30, a conductive member 93 is arranged except the inner periphery side of the flange 23a.

Figure 12B:
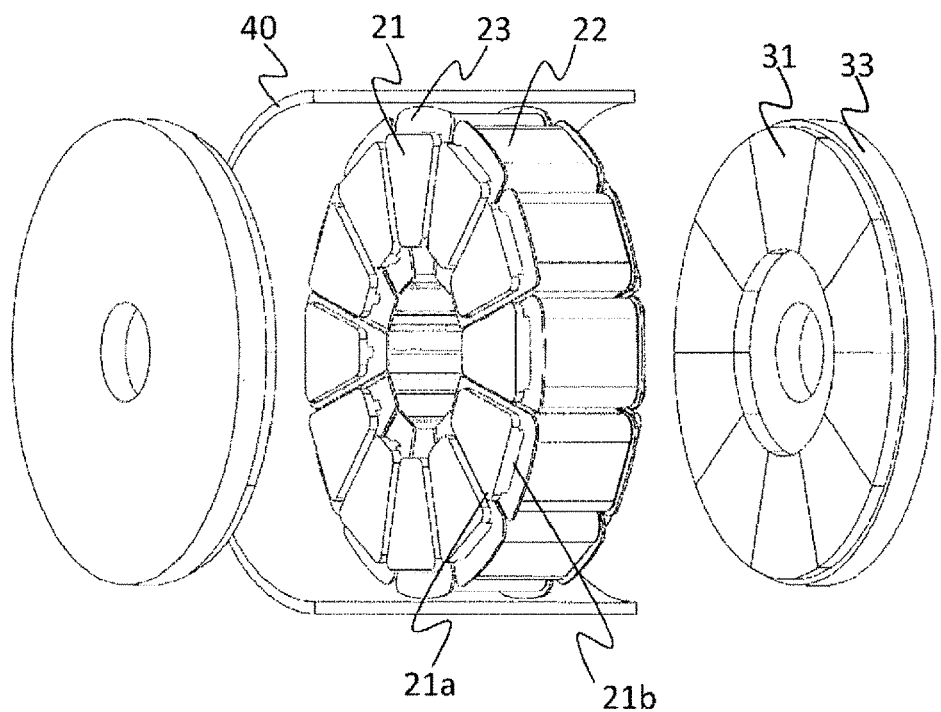
FIG. 12B is a perspective view showing a motor as a comparison example.

Further, a conductive member 94 is also arranged on the inside surface of the resin 24 facing the shaft 70. These conductive members are electrically connected to the housing 40. Usually, the open slot core 21 has a large facing area between the coil 22 and the rotor 30, and hence, Cwr tends to easily become large as compared with the core shape having a flange 21a shown in FIG. 12(b). On the other hand, with the structure of the present embodiment, the electrostatic capacitance between the coil 22 and the rotor 30 can be repressed even in the case of the open slot core. When the structure of the present embodiment is combined with the connecting wire arrangement shown in each of the embodiments described above, the shaft voltage can be sufficiently suppressed even in the case of the open slot core.

It should be noted that, in this structure, a part or all of the connecting wires 22a may be arranged in the region formed by the conductive member and the coil 22.

In the above, the embodiments according to the present invention are described, but the present invention is not limited to the above-described various configurations, and needless to say, various configurations can be applied within the scope and spirit of the present invention. Especially, it is of course possible to combine the above-mentioned various embodiments.

REFERENCE SIGNS LIST

1 Double-rotor type axial-gap permanent magnet synchronous motor (motor)
11 First region
12 Second region
19 Stator
20 Stator core
21 Core
21a Flange
21b Core section
22 Coil
22a Connecting wire
23 Bobbin
23a Flange
24 Mold resin
24a Mold protruding section
25 Holding member
25a Connecting wire storage section
30 Rotor
31 Permanent magnet
32 Back yoke
33 Yoke
40 Housing
50 Bearing
60 End bracket
70 Shaft
80 Terminal box
85 Opening
90 Insulating thin plate
91 Insulating tube
92 Conductive member
92a Insulation section
93 Conductive member
94 Conductive member
210 Lower metal mold
A Rotating shaft
H Distance of connecting wires arranged from the core end in the circumferential direction

The invention claimed is:

1. An axial-air-gap dynamo-electric machine including:
a stator configured such that a plurality of stator cores, each having at least a core and a coil wound around the outer periphery of the core, are arranged in a circle around a shaft in the direction in which magnetic lines of force are in parallel with the shaft; a housing having an inside surface facing the stators radially; and at least a rotor plane-facing the stator via a predetermined air gap expanding in the radial direction of the shaft,
the axial-air-gap dynamo-electric machine comprising:
a conductive portion made of a conductive member and provided on the outer peripheral side of the rotor;
connecting wires, which are laid-out from the plurality of the coils in an axial direction, are connected to a terminal box supplied with power from outside of the housing,
a first region formed by the inside surface of the housing and the conductive portion which radially face each other; and
a second region formed on the stator side of the first region to extend to the coil side surface which faces the rotor, wherein
a second number of the connecting wires of the plurality of stator cores which the connecting wires are arranged in the second region is larger than a first number of the connecting wires of the plurality of stator cores which the connecting wires are arranged in the first region, the first number is at least one.

2. The axial-air-gap dynamo-electric machine according to claim 1, wherein
the rotor includes a yoke connected to the shaft, and a magnet arranged on the stator side of the yoke,
the conductive portion is provided on the outer periphery of the yoke, and
the magnet is arranged on the shaft side of the outer peripheral side of the yoke.

3. The axial-air-gap dynamo-electric machine according to claim 1, wherein
the rotor included a yoke connected to the shaft, and a magnet arranged on the stator side of the yoke, and
the magnet is a non-conducting magnet arranged on the outside surface of the yoke.

4. The axial-air-gap dynamo-electric machine according to claim 3, wherein
the non-conducting magnet is a ferrite magnet.

5. The axial-air-gap dynamo-electric machine according to claim 1, wherein
at least a part of the connecting wires arranged in the second region are stacked in the rotating shaft center direction.

6. The axial-air-gap dynamo-electric machine according to claim 1, comprising
an opening through which the connecting wires are led out to the outside of the housing, and wherein
the connecting wire is arranged to be stacked, in the shaft direction, to the connecting wire of the adjacent stator core along the housing inside surface so that the inner periphery distance to the opening becomes shorter.

7. The axial-air-gap dynamo-electric machine according to claim 6, wherein
the connecting wires are arranged in the shaft direction such that the connecting wire and the adjacent connecting wire are stacked at the same position in the shaft direction.

8. The axial-air-gap dynamo-electric machine according to claim 6, wherein
each of the connecting wires is linearly arranged to the opening at an angle corresponding to the shaft direction stacking distance based on the number of stacking to the opening.

9. The axial-air-gap dynamo-electric machine according to claim 6, wherein
a plurality of the openings are provided.

10. The axial-air-gap dynamo-electric machine according to claim 6, wherein
the connecting wires are stacked in the shaft direction such that the connecting wire of one of the stator cores and the connecting wire of the adjacent stator core are respectively arranged in a facing manner along the housing inside surfaces opposite to each other about the shaft direction.

11. The axial-air-gap dynamo-electric machine according to claim 1, wherein
the connecting wires are resin-molded integrally with the inside surface of the housing.

12. The axial-air-gap dynamo-electric machine according to claim 11, wherein a tubular member concentric to the inside surface of the housing is arranged in the rotating shaft center direction of the connecting wires, and the outside surface of the ring shaped tubular member, the connecting wires, and the inside surface of the housing are integrally resin-molded.

13. The axial-air-gap dynamo-electric machine according to claim 1, wherein each of the connecting wires is covered with an insulating tube.

14. The axial-air-gap dynamo-electric machine according to claim 1, wherein an opening for leading out the connecting wires to the outside of the housing is provided at the housing in the vicinity on the radial direction extension line of the first region of the housing.

15. The axial-air-gap dynamo-electric machine according to claim 1, wherein the stator core is provided with a tubular section into which the core is inserted, and with a bobbin having an outer tubular section around which the coil is wound, the bobbin has a flange extended, by a predetermined width, in the rotating shaft center direction from the vicinity of the end portion of the outer tubular section, and a discontinuous conductive member is arranged only on the shaft center side surface of the flange which surface is located to face the rotor, and the discontinuous conductive member is electrically connected to the inside surface of the housing.

16. An axial-air-gap dynamo-electric machine including:

a stator configured such that a plurality of stator cores, each having at least a core and a coil wound around the outer periphery of the core, are arranged in a circle around a shaft in the direction in which magnetic lines of force are in parallel with the shaft; a housing having an inside surface facing the stators radially; and at least a rotor plane-facing the stator via a predetermined air gap expanding in the radial direction of the shaft, the axial-air-gap dynamo-electric machine comprising a conductive portion made of a conductive member and provided on the outer peripheral side of the rotor, connecting wires, which are laid-out from the plurality of the coils in an axial direction, are connected to a terminal box supplied with power from outside of the housing, wherein the connecting wires of the plurality of stator cores are arranged in a first region formed by the inside surface of the housing and in a second region formed on a stator side of the first region to extend to the coil side surface which faces the rotor, a number of wires in the first region being at least one, and a number of wires in the second region being greater the number of wires in the first region, a conductive shielding member electrically connected to the housing inside surface is arranged between the conductive portion and the connecting wires.

17. The axial-air-gap dynamo-electric machine according to claim 16, wherein the conductive shielding member has a tubular shape covering the outer periphery of each of the connecting wires.

18. The axial-air-gap dynamo-electric machine according to claim 16, wherein the conductive shielding member has tubular shape enclosing all of the connecting wires.

19. The axial-air-gap dynamo-electric machine according to claim 16, wherein the conductive shielding member is a plate-like member.

20. The axial-air-gap dynamo-electric machine according to claim 19, wherein the conductive shielding member is configured such that the conductive portion and an insulating portion are alternately arranged.

21. The axial-air-gap dynamo-electric machine according to claim 20, wherein the insulating portion is a slit.

* * * * *